United States Patent [19]

Elste, Jr.

[11] 3,951,676

[45] Apr. 20, 1976

[54] CATIONIC BITUMINOUS EMULSIONS FORMING RESIDUUM HAVING IMPROVED TEMPERATURE CHARACTERISTICS

[75] Inventor: Edward G. Elste, Jr., Walnut Creek, Calif.

[73] Assignee: Chevron Research Company, San Francisco, Calif.

[22] Filed: Sept. 5, 1974

[21] Appl. No.: 498,144

[52] U.S. Cl. .................. 106/277; 106/232; 106/283; 252/311.5
[51] Int. Cl.² .................. C08L 93/04; C08L 95/00; C09D 3/24
[58] Field of Search .................. 106/273–284, 232; 252/311.5

[56] References Cited
UNITED STATES PATENTS

| | | | |
|---|---|---|---|
| 1,895,775 | 1/1933 | Smith | 106/277 X |
| 2,243,519 | 5/1941 | Barth | 106/277 X |
| 2,328,481 | 8/1943 | Mayfield | 106/277 X |
| 2,786,775 | 3/1957 | Wells | 106/277 X |
| 3,236,671 | 2/1966 | Dybalski et al. | 106/277 |
| 3,257,231 | 6/1966 | McEachran et al. | 106/277 X |
| 3,305,379 | 2/1967 | Ferm | 106/277 |
| 3,422,026 | 1/1969 | Wright | 106/277 X |

Primary Examiner—Joan E. Welcome
Attorney, Agent, or Firm—G. F. Magdeburger; C. J. Tonkin; J. T. Brooks

[57] ABSTRACT

Stable, modified cationic bituminous emulsions are provided which form residuums having improved temperature susceptibility characteristics by combining with the base emulsion a tallate salt of a metallic polyvalent cation selected from the group consisting of tin, magnesium, copper, aluminum and iron.

5 Claims, No Drawings

CATIONIC BITUMINOUS EMULSIONS FORMING RESIDUUM HAVING IMPROVED TEMPERATURE CHARACTERISTICS

CROSS-REFERENCE TO RELATED APPLICATION

This application is a continuation-in-part of application Ser. No. 163,541, filed July 14, 1971, now abandoned.

BACKGROUND OF THE INVENTION

Field of the Invention

The use of bituminous emulsions in road manufacture is becoming more and more important. Air pollution controls limit the use of hot-mix methods in some localities, and these controls are becoming more widespread and more stringent. The use of cold-mix operations, i.e., bituminous emulsions, which can be utilized at ambient conditions is always desirable where practical, since high temperatures required by hot-mix operations are preferably avoided.

When utilizing bituminous emulsions, two criteria must be satisfied. The first of these is that the emulsions themselves must behave satisfactorily, i.e., breakdown, coagulation, viscosity, limitations, etc., must be satisfactory. However, once satisfactory properties of the emulsions themselves have been obtained, the second class of problems arises. This is with regard to the emulsion's asphalt fraction.

The asphalt residuum left after the emulsion has broken and the continuous aqueous phase has evaporated must meet certain criteria. The rheological parameters of asphalt must remain satisfactory throughout the service life of the asphalt surface. Temperature variations encountered over the life of the asphalt are a major determinant of rheological change and any consequent failure of the system. The asphalt residuum must be capable of binding "cover" aggregate utilized almost uniformly in road-surface manufacture. The degree of binder effectiveness is strongly dependent upon its adhesive and cohesive properties. In turn, the magnitude of these adhesive and cohesive properties is greatly influenced by the nature of the asphalt residuum.

At lower temperatures the asphalt residuum binder becomes more elastic and behaves less like a viscous liquid. Under low-temperature conditions, asphalt becomes more susceptible to fracture. When such fracturing occurs at low temperature, the practical effect is that surface vehicles utilizing the road structure cause portions of the aggregate along the fracture lines to become dislodged. The resulting breakdown of the road structure, cracked windshields from flying particles, and the like, are increased.

During the hot summer months, the adhesive properties of an asphalt residuum having a relatively high temperature susceptibility are reduced. The practical effect is the same as in cold weather. The aggregate becomes loose with the consequent increase in flying rock and damage to windshields.

This invention is directed to a method for improving the characteristics of emulsion residuum to reduce temperature susceptibility at both high and low temperatures.

SUMMARY OF THE INVENTION

Stable, modified cationic bituminous emulsions are provided which form residua having improved temperature susceptibility characteristics by combining with the base emulsion a tallate salt of a metallic polyvalent cation selected from the group consisting of tin, magnesium, copper, aluminum and iron.

DESCRIPTION OF THE INVENTION

Stable, modified cationic bituminous emulsions are provided having improved temperature susceptibility characteristics of the residuum resulting from said emulsions by combining with the base emulsion from about 1 to about 5%, preferably from 1.5–3%, and most preferably about 2% (based on the weight of the base emulsion) of a tallate salt of a metallic polyvalent cation selected from the group consisting of tin, magnesium, copper, aluminum and iron. (All parts and percents are by weight unless otherwise specified.)

The base emulsions used in the subject invention contain from 50 to 80, preferably from 60 to 75% of a bitumen having a penetration at 77°F. of from about 60 to about 150, from about 0.1 to about 1 percent of a cationic emulsifier, a minor amount of acid sufficient to give the emulsion a pH of from 4–6, and the balance water.

The base emulsions are prepared by conventional means (such as a colloid mill) well known to those of ordinary skill in the art. See, for example, U.S. Pat. Nos. 2,833,663 and 2,862,830.

The cationic emulsifier may be any of those well known in the prior art such as secondary alkyl polymethylene diamines, alkyl quaternary ammonium salts, polyethoxylated derivatives of N-fatty alkyl polymethylene diamines, and the like. The nature of the cationic emulsifier does not form part of this invention. Any compositions producing satisfactory cationic emulsions are contemplated as being useful in the subject invention.

The tallate salt (which is preferably added to the base emulsion after its preparation) may be prepared by mixing a soluble salt of the metal with a tall oil and water and heating the mixture to a temperature in the range of from about 150° to 200°F., preferably about 180°F.

Tall oil is the liquid resinous material obtained in digestion of wood pulp for paper manufacture. Commercial tall oil generally comprises a complex mixture of fatty acids, principally C18 acids, resin acids and unsaponifiables, including sterols, higher alcohols, waxes and hydrocarbons. Tall oil will vary in its proportion of these constituents depending on a number of factors, e.g., geographic location of the trees furnishing the wood pulp. The C18 fatty acid of the tall oil is a mixture of both cis and trans oleic acids, linoleic acid, linolenic acids and some saturated acids. The resin acids of the tall oil include abietic acid, neo-abietic acid, dihydroxy abietic acid, palustric and isodextropimaric acids.

Salts that may be used include cupric and cuprous chloride, stannic and stannous chloride, aluminum chloride, ferric and ferrous chloride, ferrous acetate, acidified ferric oxide, and the like. The metal salts used to form the tallate must be soluble in water. The metal salt is used at such a rate relative to the tall oil as to give about 1 part metal ions per 5–35 parts tall oil. Water is added to the system prior to heating the mixture in an amount of from about 1 part water per about 2 to about 6 parts tall oil. A preferred composition for preparing the ferric tallate is about 3 parts ferric chloride to about 20 parts tall oil and about 10 parts water.

The modified cationic bituminous emulsions of this invention are relatively stable. The modified emulsions can be stored for days or even weeks without significant breaking or settling of the bitumen out of the aqueous phase.

EXAMPLES

The following examples are offered by way of illustration and not by way of limitation. All parts and percents are by weight unless otherwise specified.

EXAMPLES 1–3

Various chemical agents were added to an RS-3K emulsion (having the formulation set forth in Table 1 below) to determine the effects of the chemical agent on the temperature susceptibility of the asphalt residuum from the emulsion.

The temperature susceptibility coefficient (TSC) was calculated using the formula $$TSC = 0.221 \, (\log(2 + \log V_1) - \log(2 + \log V_2))/\log(T_2 - \log T_1)$$

where $V_1$ and $V_2$ are absolute viscosities at absolute temperatures $T_1$ and $T_2$.

This expression is derived from Walther's expression [see "Oil u Kohle," C. Walther, 1, 71 (1933) and "Ind. Eng. Chem., Anal.," Ed. 9 (No. 3), 119 (1937) by H. Nevitt and L. Krchma].

From graphs prepared using this equation, the temperature susceptibility coefficients (TSC) were determined between 39.2°F. and 140°F. and are set forth in Table 2.

These temperatures were chosen since 140°F. is a practical maximum temperature actually occurring in realistic service performance and 39.2°F. is a practical temperature to observe the viscoelastic performance of bitumen at lower temperatures.

From the TSC the percent variation from the control was calculated. To be satisfactory in practical applications, a negative variation of about 3.5% from a control having a TSC of about 0.885 is preferred. As will be seen from Table 2 below from the positive variations obtained, some of the tested materials actually resulted in increased temperature susceptibility. It should be noted that for asphalt residua having unmodified TSC's of less than about 0.885, the negative variation need not be as large.

The asphalt utilized in the experiments was Pascagoula asphalt with penetration (at 77°F.) and viscosity (140°F.) ranges of about 110–130 and 720–950 poises respectively. This asphalt was used because unmodified emulsion residua prepared from it possess high temperature susceptibility. Some chemical agents, as shown in the tabulation, failed to produce the desired effect. These are indicated by positive variation values. The control used for comparison was the same asphalt residuum prepared from the asphalt emulsion but without the addition of any chemical agent. Directionally higher coefficient values indicate greater temperature susceptibility.

TABLE 1

| | |
|---|---|
| 68.00% | Pascagoula Asphalt |
| 0.35% | amido-amine cationic emulsifier |

TABLE 1-continued

| | |
|---|---|
| 0.12% | HCl |
| 31.53% | water |
| | pH of the emulsion is 5.5 |

TABLE 2

TEMPERATURE SUSCEPTIBILITY PERFORMANCE OF RESIDUUM FROM RS-3K EMULSION

| | Formulation | TSC | Variation, % |
|---|---|---|---|
| | Control | 0.884 | 0 |
| (1) | Added to Emulsion 1 part Acintol D30E[1] tall oil 0.3 parts Phosphoric Acid | 0.893 | +1.0 |
| (2) | Added to Emulsion 1.3 parts Ferric Tallate (using Acintol D30E tall oil) | 0.863 | −2.4 |
| (3) | Added to Emulsion 1.8 parts Ferric Tallate (using Newport PM)[2] | 0.841 | −4.9 |

| | [1]Acintol D30E | [2]Newport PM |
|---|---|---|
| Fatty Acids, % | 72 | 86 |
| Rosin Acids, % | 26 | — |
| Unsaponifiables, % | 2 | 14 |
| Acid Number | 170 | 178 |
| Saponification Number | 180 | 183 |

EXAMPLE 4

3.5 parts of aluminum chloride were reacted in an aqueous solution with 20 parts of Newport PM. The mixture was heated with agitation for 20 minutes at 150°F. The aqueous portion was then separated from the oil layer and discarded. The aluminum tallate oil layer was retained.

EXAMPLES 5–7

Using the procedure of Example 4, cupric, magnesium and stannic tallates were produced using 3.5 parts of the metal chlorides and 20 parts of Newport PM.

The metal tallates of Examples 4–7 were then tested with a Wood River asphalt emulsion. The asphalt had a penetration range at 77°F. of from 85–160 and a viscosity range at 140°F. of from 550–1350 poises. The emulsion had the formulation set forth in Table 3 below:

TABLE 3

| | |
|---|---|
| 68.00% | Wood River Asphalt |
| 0.30% | amido-amine cationic emulsifier |
| 0.11% | HCl |
| 31.59% | water |
| | pH of the emulsion is 5.5 |

1.25 parts of the metal tallate was added to 98.75 parts of the emulsion.

Temperature susceptibility coefficients were calculated from viscosity measurements on the residuum obtained at 39.2°F. and 140°F. The results are tabulated in Table 4 below:

TABLE 4

| No. | Added to Emulsion | TSC | Variation, % |
|---|---|---|---|
| | Control (base emulsion) | 0.924 | 0 |
| (4) | 1.25 parts aluminum tallate | 0.907 | −1.8 |
| (5) | 1.25 parts cupric tallate | 0.887 | −4.0 |
| (6) | 1.25 parts magnesium tallate | 0.901 | −2.6 |

TABLE 4-continued

| No. | Added to Emulsion | TSC | Variation, % |
|---|---|---|---|
| (7) | 1.25 parts stannic tallate | 0.876 | −5.3 |

EXAMPLE 8

1.25 parts of stannic tallate prepared from 1 part stannic chloride and 5.7 parts Acintol D30E was added to 98.5 parts of a cationic emulsion having the formulation set forth in Table 5.

TABLE 5

| | |
|---|---|
| 68.00% | Asphalt (150/200 penetration) |
| 0.30% | N-alkyl trimethylene diamine cationic emulsifier where alkyl is tallow |
| 0.12% | HCl |
| 31.58% | water |
| | pH of the emulsion is 5.5 |

Temperature susceptibility coefficients were calculated from viscosity measurements on the residuum obtained at 39.2°F. and 140°F. The results are shown in Table 6.

TABLE 6

| Added to Emulsion | TSC | Variation, % |
|---|---|---|
| Control | 0.885 | 0 |
| 1.25 parts stannic tallate | 0.863 | −2.5 |

EXAMPLE 9

Emulsion Stability Compared to Tallate Cation

A bituminous emulsion is prepared from Pascagoula asphalt with a penetration at 77°F. of about 110–130 and a viscosity at 140°F. of 720–950 poises. The emulsion has the composition shown in Table 7.

TABLE 7

| BASE EMULSION | |
|---|---|
| 68.00% | Pascagoula Asphalt |
| 0.35% | amido-amine cationic emulsifier |
| 0.12% | HCl |
| 31.53% | water |
| | pH of the emulsion is 5.5 |

To 98.5 parts of this base emulsion is added 1.25 parts of one of various tallate salts prepared from Newport PM by the procedure described in Example 4 above. The modified emulsions are then stored at room temperature for various lengths of time and the storage stability noted. The results are shown in Table 8.

TABLE 8

STORAGE STABILITY OF MODIFIED EMULSIONS

| Modifier | Storage Stability |
|---|---|
| aluminum tallate | Stable after one week |
| magnesium " | " |
| ferric " | Stable after 30 days |
| stannic " | " |
| sodium " | Unstable and broke within a few minutes |
| calcium " | Unstable and broke within a few minutes |

The above data demonstrate that the modified emulsions of this invention are quite stable.

What is claimed is:

1. A stable, modified cationic oil-in-water bituminous emulsion comprised of:
   1. from 95–99 parts by weight of a cationic bituminous emulsion containing
      a. from 50–80% parts by weight of a bitumen having a penetration at 77°F. of from about 60–150,
      b. from about 0.1–1% of a cationic emulsifier,
      c. a minor amount of acid sufficient to give the emulsion a pH of from about 4 to about 6,
      d. and the balance to make 100% by weight being water, and
   2. from about 1 to about 5 parts by weight of a tallate salt of a metallic polyvalent cation selected from the group consisting of tin, magnesium, copper, aluminum and iron, wherein the weight ratio of said cation to tall oil is from 1:5–35 and with the proviso that the total parts by weight of said modified emulsion is 100.

2. The said modified emulsion of claim 1 wherein said tallate salt is present in an amount of from 1.5–3 parts by weight.

3. The said modified emulsion of claim 2 wherein said metallic polyvalent cation is iron.

4. The said modified emulsion of claim 2 wherein said metallic polyvalent cation is tin.

5. The said modified bituminous emulsion of claim 1 wherein said cationic bituminous emulsion contains 68% by weight bitumen, said acid is hydrochloric acid, said tallate salt is derived from a tall oil having a fatty acid content of about 86% by weight, unsaponifiables of about 14% by weight, and acid number of 178, and a saponification number of 183, said polyvalent cation is stannic and wherein the ratio of said cation to said tall oil is 1.6:20 and said tallate salt is present in an amount of 1.25 parts.

* * * * *